(12) United States Patent
Shimizu et al.

(10) Patent No.: US 7,936,661 B2
(45) Date of Patent: May 3, 2011

(54) OPTICAL INFORMATION RECORDING MEDIUM

(75) Inventors: Atsuo Shimizu, Gunma (JP); Shinichi Kojo, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 204 days.

(21) Appl. No.: 12/182,724

(22) Filed: Jul. 30, 2008

(65) Prior Publication Data

US 2009/0059778 A1 Mar. 5, 2009

(30) Foreign Application Priority Data

Jul. 31, 2007 (JP) ................................. 2007-198850

(51) Int. Cl.
*G11B 7/00* (2006.01)
(52) U.S. Cl. .................... 369/275.4; 369/277; 428/64.1
(58) Field of Classification Search .............. 369/275.2, 369/275.3, 275.1–275.4
See application file for complete search history.

(56) References Cited

U.S. PATENT DOCUMENTS

| 6,452,899 B1 | 9/2002 | Fujii et al. |
| 2002/0060980 A1* | 5/2002 | Ohkubo et al. ............ 369/275.4 |
| 2002/0150030 A1* | 10/2002 | Takagishi et al. .......... 369/275.1 |
| 2006/0203702 A1* | 9/2006 | Woerlee et al. ............ 369/275.3 |
| 2007/0070875 A1* | 3/2007 | Mizukami ................. 369/288 |

FOREIGN PATENT DOCUMENTS

| JP | 10-092016 A | 4/1998 |
| JP | 2000-030257 A | 1/2000 |
| JP | 2002-157740 | 5/2002 |

* cited by examiner

*Primary Examiner* — Hoa T Nguyen
*Assistant Examiner* — Andrew J Sasinowski
(74) *Attorney, Agent, or Firm* — Law Office of Katsuhiro Arai (57) ABSTRACT

Provided is an optical information recording medium that can be recorded with data with only a special recording apparatus and the recorded data can be read out with a general recording/reproducing apparatus. The optical information recording medium includes a disc-like light-transmissive substrate having a surface provided with a spiral groove WB having a wobble and a land LN between adjacent segments of the groove WB, a light-absorbing layer disposed on the surface of the light-transmissive substrate, and a light reflection layer disposed on the light-absorbing layer. The groove WB has a depth Ds of about 140 nm$\leq$Ds$\leq$155 nm, the light-absorbing layer has a recess with a depth Dd of about 95 nm$\leq$Dd$\leq$105 nm in the groove, and a push-pull signal before recording has a value of about 0.3 or less. The optical information recording medium may include an anti-illegal copy measure.

10 Claims, 6 Drawing Sheets

OPTICAL INFORMATION RECORDING MEDIUM

BACKGROUND OF THE INVENTION

1. Field of the Invention

The present invention relates to an optical information recording medium that records information with a special recording apparatus and reproduces the information with an existing reproducing apparatus.

2. Description of the Related Art

A compact disc recordable (so-called CD-R) includes a light-transmissive substrate with a diameter of 12 cm and a thickness of 1.2 mm and a surface provided with a spiral groove for guiding an optical head and recording information. On the surface having the groove, a recording layer and a reflection layer are disposed in this order. This groove is provided with a wobble meandering at a predetermined cycle along the running direction for detecting exact location information. This groove is also called a track. The cross section in the running direction of the groove has a trapezoidal shape having an upper portion broadly opened and a bottom with a slightly narrowed width. In general, data is recorded on and/or reproduced from the recording layer by irradiating the substrate with laser light having a wavelength of about 780 nm from the other side of the substrate. A digital versatile disc recordable (so-called DVD-R) includes a light-transmissive substrate with a diameter of 12 cm and a thickness of 0.6 mm and a surface provided with a spiral groove, as in above, having a wobble meandering at a pitch smaller than the half of the cycle of the CD-R. A recording layer and a reflection layer are disposed in this order on the surface having the groove, and a dummy substrate with a diameter of 12 cm and a thickness of 0.6 mm is further pasted thereon. In general, data is recorded on and/or reproduced from the recording layer by irradiating the substrate with laser light having a wavelength of about 630 to 680 nm from the other side of the substrate.

Optical information recording media such as CD-Rs and DVD-Rs are capable of recording and reproducing large amounts of digital data relatively inexpensively and are thereby widely used. However, since it is easy to copy data recorded in these optical information recording media, there is a concern that illegally copied products, such as music CDs and videos, may appear on the market. In addition, recently, data of images and music are distributed online, and, therefore, a system for protecting copyright is required.

As described in Japanese Unexamined Patent Application Publication No. 2002-157740, many companies provide various systems for protecting copyright. Furthermore, optical information recording media that record data with a special recording apparatus, but reproduce the data with a general reproducing apparatus, have been developed in recent years. In such optical information recording media, recording of data is impossible without the special recording apparatus, which is very effective for preventing illegal copy.

In the optical information recording medium that records data with a special recording apparatus, the recorded data is read out without problems using a general reproduction-only apparatus, such as a DVD reproducing apparatus. However, a general recording/reproducing apparatus, such as a recording drive of a personal computer or a DVD recorder, may not read out the data due to an error.

Such a general recording/reproducing apparatus includes a system that detects the class of an optical information recording medium. This procedure is also applied to an optical information recording medium provided with an anti-illegal copy measure. In this case, the general recording/reproducing apparatus does not recognize the optical information recording medium provided with an anti-illegal copy measure as a read only memory (i.e., ROM), but recognizes it instead as a recordable optical information recording medium. However, since a general recording apparatus is not capable of recording data on this optical information recording medium provided with an anti-illegal copy measure, a read-out error occurs. As a result, a problem of not reading out the recorded data is caused.

SUMMARY OF THE INVENTION

Accordingly, it is an object of the present invention to provide an optical information recording medium provided with an anti-illegal copy measure such that only a special recording apparatus is capable of recording data on the medium and a general recording/reproducing apparatus is capable of reading out the data from the medium.

In order to achieve the above-mentioned object, a first aspect of the present invention for solving the above-mentioned problems is an optical information recording medium including a disc-like light-transmissive substrate having a surface provided with a spiral groove having a wobble and having a land between adjacent segments of the groove, a light-absorbing layer disposed on the surface of the light-transmissive substrate, and a light reflection layer disposed on the light-absorbing layer, wherein the groove has a depth Ds of about 140 nm$\leq$Ds$\leq$155 nm, the light-absorbing layer has a recess with a depth Dd of about 95 nm$\leq$Dd$\leq$105 nm in the groove, and a push-pull signal before recording (hereinafter, referred to as PPb) has a value of about 0.3 or less.

The first aspect of the present invention for solving the problems functions as follows: In a general reproduction-only apparatus or recording/reproducing apparatus, a reproduction operation of an ROM medium is carried out by detecting a phase difference between a recorded portion and an unrecorded portion. That is, in an ROM medium, track-following is not performed by push-pull signals, but performed by phase difference signals between a recorded portion and an unrecorded portion. Accordingly, in an optical information recording medium, such as a DVD-R, track-following by push-pull signals is necessary for the recording process, but the track-following after recording may be performed by phase difference signals between a recorded portion and an unrecorded portion, as in the ROM medium. Consequently, the push-pull signal level after recording (hereinafter, referred to as PPa) should be suppressed as low as possible in order to detect a recorded optical information recording medium as an ROM medium. Accordingly, an optical information recording medium that records information with only a special recording apparatus and reproduces the information with a general reproduction-only apparatus or recording/reproducing apparatus is newly standardized. In order to satisfy the standard, the value of PPa must be kept lower than about 0.4. According to the first aspect for solving the problems, PPa is kept low, preferably, lower than about 0.4, and an optical information recording medium that records information with only a special recording apparatus and reproduces the information with a general reproduction-only apparatus or recording/reproducing apparatus is provided.

Furthermore, a second aspect of the present invention for solving the problems is an optical information recording medium that satisfies, in addition to the requirements in the first aspect, the requirement that the groove has a wobble frequency of about 270 kHz to about 290 kHz. This optical information recording medium meets the above-described standard. That is, only a special recording apparatus is capable of recording information on the medium, and a general reproduction-only apparatus or recording/reproducing apparatus is capable of reading out the information from the medium.

According to the present invention, an optical information recording medium that is prevented from illegal copy is provided. That is, in the optical information recording medium, only a special recording apparatus is capable of recording data on the medium, and a general recording/reproducing apparatus is not capable of writing data on the medium and is capable of only reading out the data from the medium.

DETAILED DESCRIPTION OF PREFERRED EMBODIMENTS

Figure 1:
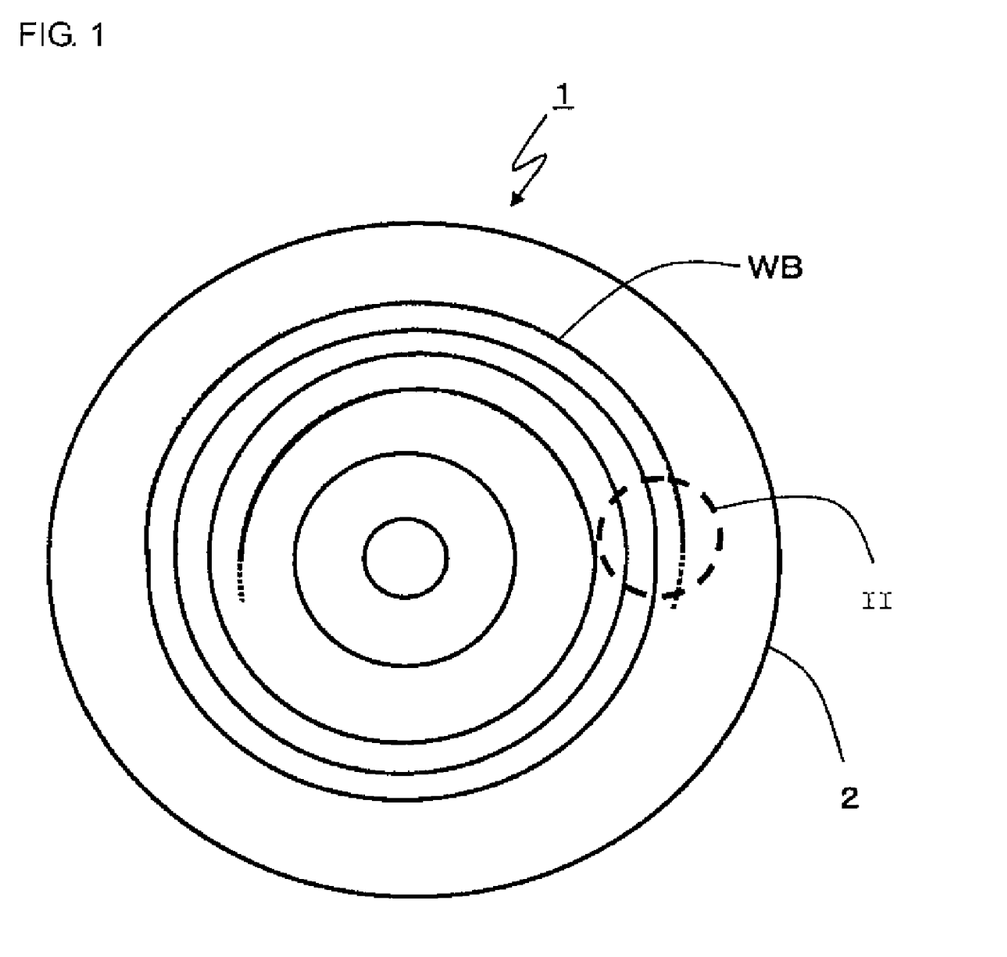
FIG. 1 is a plan view schematically illustrating an optical information recording medium of the present invention.
Figure 2:
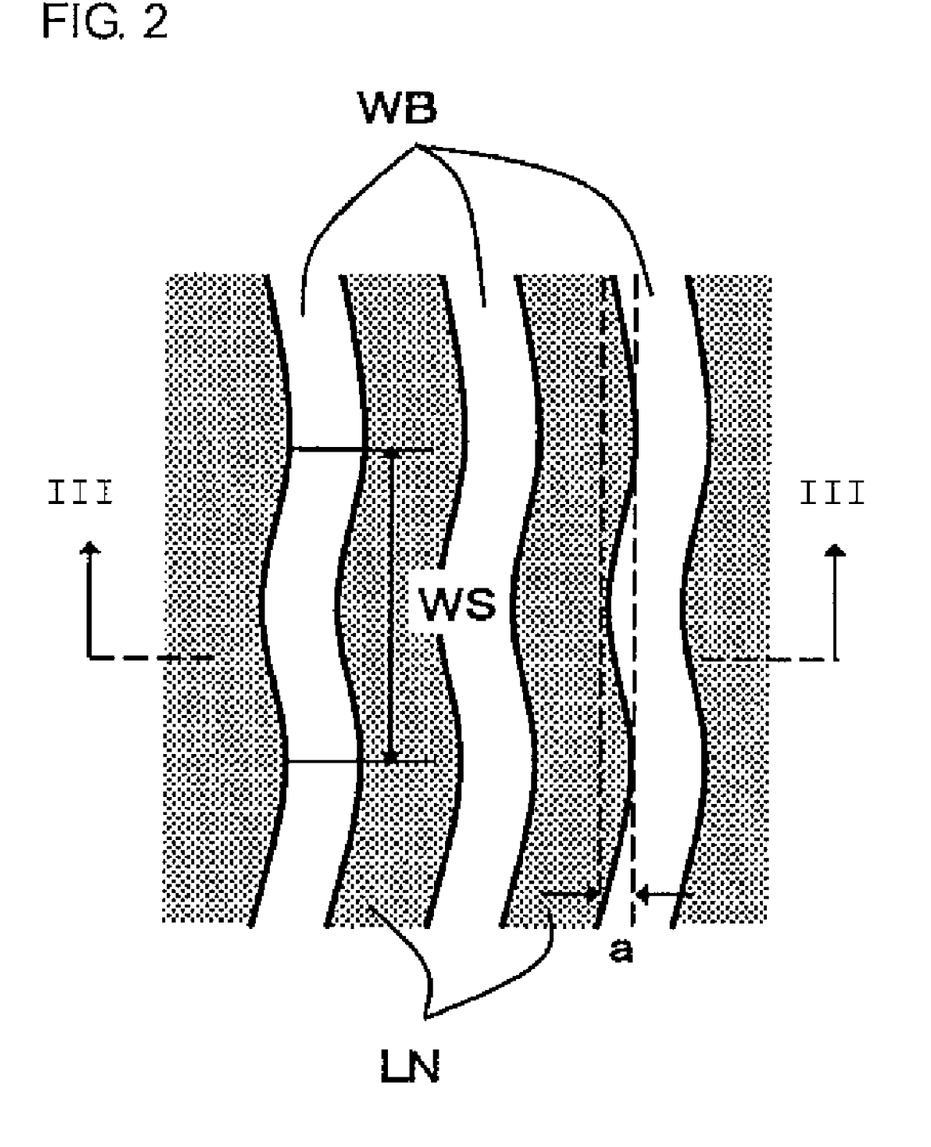
FIG. 2 is a partially enlarged view of a portion indicated with dotted line II in FIG. 1.
Figure 3:
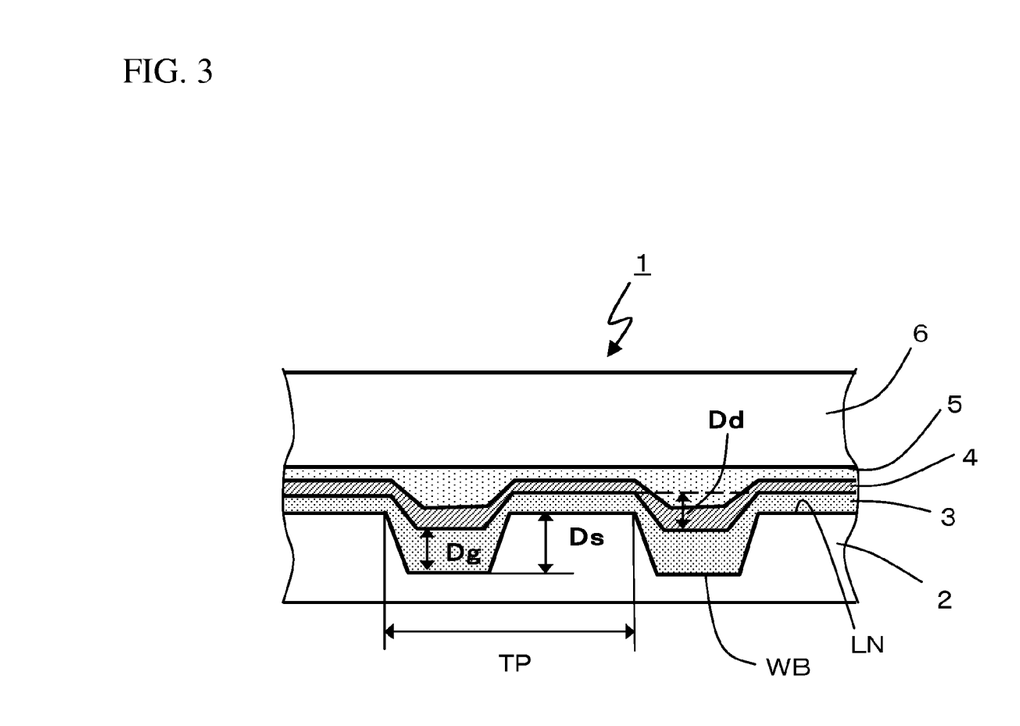
FIG. 3 is a schematic cross-sectional view taken along the line III-III of FIG. 2.

An embodiment of an optical information recording medium of the present invention will now be described with reference to a DVD-R. It will be understood that the DVD-R embodiment is merely an example, and does not limit the present invention in any way. Those of skill in the art will appreciate embodiments other than a DVD-R that may be made without departing from the scope of the present invention. The structure of the optical information recording medium is shown in FIGS. 1 to 3. FIG. 1 is a schematic plan view, FIG. 2 is a partially enlarged view of a portion indicated with dotted line II in FIG. 1, and FIG. 3 is a schematic partial cross-sectional view taken along the line III-III of FIG. 2. Referring to these drawings, the present invention will be described below.

The optical information recording medium 1 includes a disc-like light-transmissive substrate 2, a spiral groove WB provided to a surface of the light-transmissive substrate 2, a light-absorbing layer 3 disposed on the surface provided with the groove WB, a light reflection layer 4 disposed on the upper face of the light-absorbing layer 3, and a dummy substrate 6 pasted to the upper face of the light reflection layer 4 via an adhesive layer 5.

The light-transmissive substrate 2 is a disc-like substrate having a diameter of 8 cm or 12 cm and a thickness of 0.6 mm. As shown in FIGS. 1 and 2, one surface of this light-transmissive substrate 2 has a spiral groove WB with a wobble and a land LN between adjacent segments of the groove WB. In FIG. 1, the groove WB is schematically illustrated for easier understanding of the structure.

As shown in FIG. 3, the groove WB and the land LN are arranged with a predetermined track pitch TP. The track pitch TP of, for example, a DVD-R is within a range of 0.71 to 0.77 μm. In addition, as shown in FIG. 2, the groove WB meanders with a wobble width a at a wobble cycle WS. The wobbling frequency of the groove WB is defined by the wobble cycle WS. This wobble cycle WS is set such that the frequency of the wobble (hereinafter, referred to as wobble frequency) is 140.6 kHz, for example, in a general DVD-R. The wobble width a of, for example, a DVD-R, is within a range of 20 to 35 nm. The depth Ds of the groove is within a range of 150 to 160 nm in a general DVD-R, for example. In the DVD-R according to the present invention of FIG. 3, the depth Ds is within a range of about 140 nm to about 155 nm.

The light-transmissive substrate 2 may be made of any material that is used for substrates of conventional optical information recording media. Examples of the material include acrylic resins such as polycarbonate and polymethylmethacrylate. These materials may be used as a laminate according to need. Among these materials, from the viewpoints of moldability, humidity resistance, size stability, cost, and other factors, thermoplastic resins are preferred, and polycarbonate is particularly preferred. In the case using such a resin, the light-transmissive substrate 2 is formed by, for example, injection molding. Here, the term "light-transmissive" is defined as a light transmittance of 70% or more and preferably 80% or more when it is measured using light having a wavelength of about 630 to 680 nm with a spectrophotometer.

The light-absorbing layer 3 is a so-called information recording layer on which recording pits are formed by thermal energy generated by absorption of recording laser light. As the light-absorbing layer 3, a pigment recording layer containing an organic pigment serving as a recording material may be used. Preferable examples of the organic pigment include phthalocyanine pigments, cyanine pigments, and azo pigments. The light-absorbing layer 3 may be formed by dissolving the above-mentioned pigment, together with a binder and other components, in a suitable solvent to prepare a coating liquid; applying this coating liquid to the surface provided with the groove WB of the light-transmissive substrate 2 by, for example, spin coating or screen printing to form a film; and drying the film.

The pits are formed on the light-absorbing layer 3 in areas corresponding to the groove WB. The light-absorbing layer 3 has a thickness Dg in the groove WB, and this thickness Dg of the light-absorbing layer 3 in the groove WB affects recording characteristics and is set within a range of about 102 nm to about 106 nm in the present embodiment. Furthermore, the light-absorbing layer 3 has a recess with a depth Dd at a portion corresponding to the groove WB. The depth Dd of this recess is defined by a difference in level between the upper face of the light-absorbing layer 3 at the land LN and the upper face of the light-absorbing layer 3 at the groove WB, and this depth Dd affects unrecorded characteristics. In the present embodiment, the depth Dd is within a range of about 95 nm to about 105 nm.

The light reflection layer 4 reflects recording laser light and reproducing laser light. This light reflection layer 4 is made of, for example, a metal film of Au, Al, Ag, Cu, Pd, or the like, an alloy film of any of these metals, or an alloy film of any of these metals to which minor components are added. The light reflection layer 4 is formed on the light-absorbing layer 3 by a method such as vapor deposition, ion plating, or sputtering. Among these methods, sputtering is particularly preferred from the viewpoints of mass production and cost.

The dummy substrate 6 adjusts the total thickness of the optical information recording medium 1 so as to have dimensional compatibility with CDs, and is a disc-like substrate having a diameter of 8 cm or 12 cm and a thickness of 0.6 mm. The dummy substrate 6 may be made of the same material as that of the light-transmissive substrate 2 and can be formed by the same method as in the light-transmissive substrate 2. This dummy substrate 6 is not required to have a groove WB, unlike in the light-transmissive substrate 2. The adhesive layer 5 for attaching the dummy substrate 6 to the light reflection layer 4 is, for example, a curing resin such as an epoxy resin.

In the optical information recording medium 1 of the present invention, only a special recording apparatus is capable of recording data on the medium, and an anti-illegal copy measure is provided so that a general recording apparatus is not capable of recording data on the medium. This anti-illegal copy measure is, for example, a method that data recognizable with only a special recording apparatus is written in a pre-write area (not shown) of the optical information recording medium 1. In another anti-illegal copy measure, the wobble frequency of the groove WB is set to a range of about 270 kHz to about 290 kHz. This makes it possible to distinguish, on an apparatus, the optical information recording medium 1 from a general DVD-R having a wobble frequency of the groove WB of 140.6 kHz. The wobble frequency of the groove WB can be controlled to the range of about 270 kHz to about 290 kHz by making the length of the wobble cycle WS shown in FIG. 2 to about a half of that of the conventional medium.

The anti-illegal copy measure employing the wobble frequency of the groove WB has the following advantages: The method of writing data recognizable with only a special recording apparatus in a pre-write area is similar to that employing software. Accordingly, a general recording apparatus installed with software that can recognize the data may become capable of writing data on a DVD-R provided with this anti-illegal copy measure. However, the anti-illegal copy measure employing the wobble frequency of the groove WB is similar to that employing hardware. Accordingly, the general recording apparatus is not capable of recognizing the DVD-R as a medium on which the general recording apparatus can write.

The function and effect of the present embodiment will now be described. The gist of the present embodiment lies in that a general recording/reproducing apparatus is capable of reproducing information from a DVD-R provided with an anti-illegal copy measure. That is, the value of PPa is decreased to, preferably, lower than about 0.4 such that only a special recording apparatus is capable of recording information on the DVD-R provided with an anti-illegal copy measure and a general reproduction-only apparatus or recording/reproducing apparatus is capable of reproducing the information from the DVD-R provided with an anti-illegal copy measure. How a PPa lower than about 0.4 is achieved in the present invention will be described in detail with reference to examples.

EXAMPLES

Sample discs each provided with a groove WB having a depth Ds and a light-absorbing layer 3 having a thickness Dg in the groove WE were produced such that the depths Ds and the thicknesses Dg of the sample discs are different from each other in size. The prepared sample discs were subjected to measurement of PPa and PPb. The depths Ds of the grooves WB were respectively formed with a plurality of stampers having projections with heights corresponding to the depths Ds of the grooves WB. The thicknesses Dg of the light-absorbing layers 3 were controlled by the thicknesses of coatings of a pigment solution. The widths, track pitches, and the wobble frequencies of the grooves WB of the sample discs were substantially the same. The pigment solution for forming the light-absorbing layers 3 was prepared by dissolving a pigment mixture mainly containing an azo pigment represented by the following chemical formula I in tetrafluoropropanol (TFP). The wobble frequency of each groove WB was 281.2 kHz.

Chemical Formula 1

The PPb of each sample disc was measured before recording pits, and the PPa was measured after recording the pits. The PPa, PPb, and modulation were measured with a recording/reproducing apparatus manufactured by Pulstec Industrial Co., Ltd. The PPa and PPb of each sample disc were measured, and then the cross-section of each sample disc was observed with an SEM (Scanning Electron Microscope) to measure the depth Ds of the groove WB and the depth Dd of the recess of the light-absorbing layer 3 in the groove WB. The depth Ds of the groove WB and the depth Dd of the recess of the light-absorbing layer 3 in the groove WB were measured using a probe (AFM: manufactured by SII, SPI3800N/L-trace). The measurement results are shown in Table 1.

TABLE 1

| | Ds (nm) | Dd (nm) | PPb | PPa | Modulation |
|---|---|---|---|---|---|
| Example 1 | 147.0 | 100.0 | 0.270 | 0.383 | 0.625 |
| Example 2 | 140.0 | 95.3 | 0.241 | 0.363 | 0.607 |
| Example 3 | 153.4 | 104.5 | 0.297 | 0.400 | 0.642 |
| Comparative Example 1 | 135.0 | 91.9 | 0.220 | 0.349 | 0.593 |
| Comparative Example 2 | 160.0 | 109.0 | 0.324 | 0.419 | 0.659 |

Figure 4:
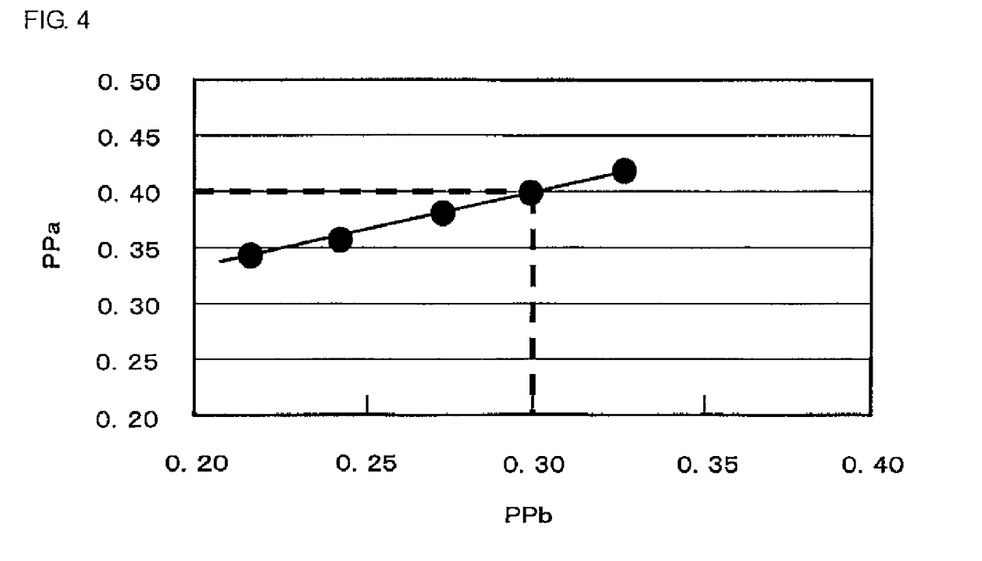
FIG. 4 is a graph showing a relationship between PPa and PPb.

FIG. 4 shows a relationship between PPa and PPb. As shown in this result, the value of PPa is lower than about 0.4 when the value of PPb is about 0.3 or less. Since the value, 0.3, of PPb is a very low value, servo characteristics of general recording apparatuses cannot satisfy such a requirement. Consequently, a special recording apparatus is necessary for recording data.

Figure 5:
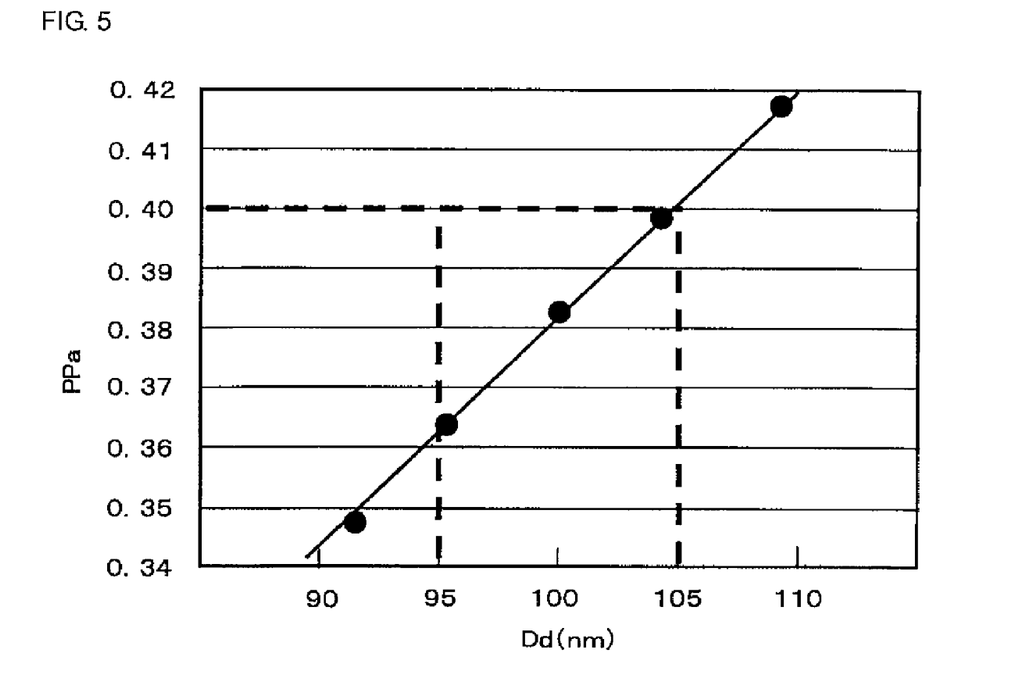
FIG. 5 is a graph showing a relationship between the depth Dd of the recess of the light-absorbing layer 3 and PPa.

FIG. 5 shows PPa plotted versus the depth Dd of the recess of the light-absorbing layer. As shown in this result, the value of PPa is lower than about 0.4 when the depth Dd of the recess of the light-absorbing layer is about 105 nm or less. A depth Dd smaller than about 95 nm cannot form a change in optical path lengths of a pit-forming portion and a non-pit-forming portion, therefore not sufficiently providing a modulation of 0.60 or more. Consequently, the depth Dd is preferably in a range of about 95 nm to about 105 nm.

Figure 6:
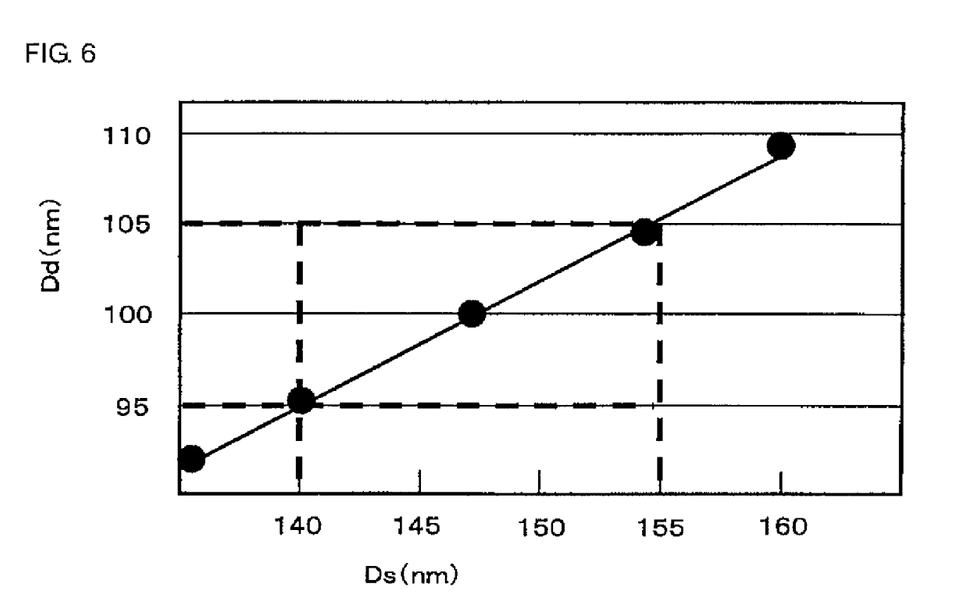
FIG. 6 is a graph showing a relationship between the depth Ds of the groove WB and the depth Dd of the recess of the light-absorbing layer 3.

FIG. 6 shows a relationship between the depth Ds of the groove WB and the depth Dd of the recess of the light-absorbing layer. As shown in this result, the depth Dd of the recess of the light-absorbing layer is within a range of about 95 nm to about 105 nm when the depth Ds of the groove WB is within a range of about 140 nm to about 155 nm.

The results above confirm that PPa is decreased to lower than about 0.4 when the depth Ds of the groove WB is about 140 nm≦Ds≦155 mm, the depth Dd of the recess of the light-absorbing layer 3 in the groove WB is about 95 nm≦Dd≦105 nm, and the value of PPb is about 0.3 or less, which provides an optical information recording medium that is provided with an anti-illegal copy measure such that only a special recording apparatus is capable of recording data on the medium and a general recording/reproducing apparatus is capable of reading out the data from the medium.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording medium comprising a disc-like light-transmissive substrate having a surface provided with a spiral groove having a wobble and a land between adjacent segments of the groove, a light-absorbing layer disposed on the surface of the light-transmissive substrate, and a light reflection layer disposed on the light-absorbing layer, wherein
    the groove has a depth Ds of about 140 nm≦Ds≦155 nm;
    the light-absorbing layer has a recess with a depth Dd of about 95 nm≦Dd≦105 nm in the groove;
    the light-absorbing layer has a thickness Dg of about 102 nm≦Dg≦106 nm in the groove; and
    a push-pull signal derived from the optical recording medium before recording has a value of 0.241 or higher but about 0.3 or less;
    said optical information recording medium being such that only a recording apparatus made specifically for the optical information recording medium is capable of recording data on the medium and a general recording/reproducing apparatus is capable of reading out the data from the medium.

2. The optical information recording medium according to claim 1, wherein the groove has a wobble frequency within a range of about 270 kHz to about 290 kHz.

3. The optical information recording medium according to claim 1, wherein a push-pull signal derived from the optical information recording medium after recording has a value of about 0.4 or less.

4. The optical information recording medium according to claim 1, further comprising an anti-illegal copy measure.

5. The optical information recording medium according to claim 1, which has a modulation of 0.60 or more.

6. The optical information recording medium according to claim 1, which is a DVD-R having a track pitch of 0.71 µm to 0.77 µm.

7. A method of manufacturing an optical information recording medium, comprising:
    forming a light-transmissive disc with a spiral groove on a first side thereof, the spiral groove having a land between adjacent segments of the groove and having a depth Ds of about 140 nm≦Ds≦155 nm;
    forming a light absorbing layer on the first side of the disc, the light absorbing layer having a recess with a depth Dd of about 95 nm≦Dd≦105 nm in the groove and having a thickness Dg of about 102 nm≦Dg≦106 nm in the groove; and
    forming a light reflection layer on a side of the information recording layer opposite the disc;
    wherein a push-pull signal derived from the optical information recording medium before recording has a value of 0.241 or higher but about 0.3 or less,
    said optical information recording medium being such that only a recording apparatus made specifically for the optical information recording medium is capable of recording data on the medium and a general recording/reproducing apparatus is capable of reading out the data from the medium.

8. The method of claim 7, wherein forming the disc comprises forming the disc with a spiral groove having a wobble.

9. The method of claim 8, wherein a frequency of the wobble is within a range of about 270 kHz to about 290 kHz.

10. The method of claim 7, wherein a push-pull signal derived from the optical information recording medium after recording has a value of about 0.4 or less.

* * * * *